(12) United States Patent
Florin

(10) Patent No.: US 10,620,081 B2
(45) Date of Patent: Apr. 14, 2020

(54) METHOD FOR OPERATING A MAGNETIC-INDUCTIVE FLOWMETER AND MAGNETIC-INDUCTIVE FLOWMETER

(71) Applicant: KROHNE Messtechnik GmbH, Duisburg (DE)

(72) Inventor: Wilhelm Florin, Duisburg (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 119 days.

(21) Appl. No.: 15/680,503

(22) Filed: Aug. 18, 2017

(65) Prior Publication Data

US 2018/0052022 A1 Feb. 22, 2018

(30) Foreign Application Priority Data

Aug. 21, 2016 (DE) ........................ 10 2016 115 483

(51) Int. Cl.
*G01M 3/32* (2006.01)
*G01F 25/00* (2006.01)
*G01F 15/00* (2006.01)
*G01F 1/60* (2006.01)
*G01F 1/58* (2006.01)

(52) U.S. Cl.
CPC ............ *G01M 3/3254* (2013.01); *G01F 1/58* (2013.01); *G01F 1/60* (2013.01); *G01F 15/00* (2013.01); *G01F 25/0007* (2013.01)

(58) Field of Classification Search
CPC .......... G01M 3/00; G01M 3/045; G01M 3/16; G01M 3/40; G01M 3/3254; G01F 1/58; G01F 1/582; G01F 1/586; G01F 1/588; G01F 1/60; G01F 1/66; G01F 25/007; G01F 23/26; G01D 3/08
See application file for complete search history.

(56) References Cited

U.S. PATENT DOCUMENTS

| | | |
|---|---|---|
| 6,594,613 B1 | 7/2003 | Ley et al. |
| 6,611,770 B1 | 8/2003 | O'Donnell et al. |
| 6,611,775 B1 | 8/2003 | Coursolle et al. |

(Continued)

FOREIGN PATENT DOCUMENTS

| | | |
|---|---|---|
| DE | 10 2007 024 006 A1 | 11/2008 |
| JP | 2005-207984 A | 8/2005 |

*Primary Examiner* — Justin N Olamit
(74) *Attorney, Agent, or Firm* — David S. Safran; Roberts Calderon Safran & Cole, P.C.

(57) ABSTRACT

A method for operating a magnetic-inductive flowmeter that has at least one measuring unit for measuring the flow of a medium through a pipeline, a housing and at least one control and evaluation unit, wherein the measuring unit has at least one coil for generating a magnetic field, and wherein at least one capacitance formed in conjunction with the coil forms a resonant circuit and wherein the resonant circuit has at least one measured variable characterizing it. A particularly reliable operation of the flowmeter is achieved in that the resonant circuit is excited with an excitation frequency, that the measured variable characterizing the resonant circuit is determined, that a comparison value of the measured variable characterizing the resonant circuit for the leak-free case is stored in the control and evaluation unit and that the measured variable characterizing the resonant circuit is compared to the comparison value.

14 Claims, 3 Drawing Sheets

(56) References Cited

U.S. PATENT DOCUMENTS

| | | | |
|---|---|---|---|
| 6,615,149 B1 | 9/2003 | Wehrs | |
| 6,697,742 B1 * | 2/2004 | Franklin | G01D 18/00 |
| | | | 702/100 |
| 7,498,799 B2 | 3/2009 | Allen et al. | |
| 7,750,642 B2 * | 7/2010 | Graber | G01F 25/0007 |
| | | | 324/439 |
| 10,024,707 B2 * | 7/2018 | Tham | G01F 1/584 |
| 2010/0100026 A1 | 4/2010 | Morris | |
| 2010/0288954 A1 | 11/2010 | Czimmek et al. | |

* cited by examiner

METHOD FOR OPERATING A MAGNETIC-INDUCTIVE FLOWMETER AND MAGNETIC-INDUCTIVE FLOWMETER

BACKGROUND OF THE INVENTION

Field of the Invention

The invention is based on a method for operating a magnetic-inductive flowmeter, wherein the magnetic-inductive flowmeter has at least one measuring unit for measuring the flow of a medium through a pipeline, a housing and at least one control and evaluation unit, wherein the measuring unit has at least one coil for generating a magnetic field, wherein at least one capacitance formed in conjunction with the coil is provided, wherein the inductance of the coil forms a resonant circuit with the capacitance and wherein the resonant circuit has at least one measured variable characterizing it. Furthermore, the invention is based on a magnetic-inductive flowmeter.

Description of Related Art

For determining the flow of a medium through a pipeline, magnetic-inductive flowmeters use the effect that a voltage proportional to the flow rate of the medium can be induced in a conductive medium by a magnetic field acting on moving charge carriers. In order to induce the voltage, magnetic-inductive flowmeters have a measuring unit with a coil arrangement, which is arranged on the pipeline during operation and which is flowed through during operation with a current changing over time. In this manner, a magnetic field is generated within the pipeline, in particular in the medium to be measured, which causes charge separation in the medium and thus induces a voltage that is dependent on the flow of the medium. To detect the induced voltage, electrodes are arranged transversely to the magnetic field within the measuring unit, however, this is not relevant for the subsequent illustration of the invention.

Particularly in the connecting regions of the measuring unit to further components and/or in the region of the electrodes, however, a leakage can occur despite the simple construction and integration of such a measuring device into the application environment. Leaks at these locations often result in the penetration of moisture into the housing and thus the measuring unit, which affects the measurement of small electrode voltages or even makes it impossible. In order to ensure reliable operation of a magnetic-inductive flowmeter and to detect leakages in the entire process and to avoid consequential damage, it is therefore fundamental to detect leaks of the measuring unit at an early stage in order to take measures for eliminating leaks on time.

A magnetic-inductive flowmeter with a diagnostic circuit that detects the presence of an electrical leakage in the electrode circuit of the flowmeter is known from the European Patent EP 1 285 237 B1 and corresponding U.S. Pat. No. 6,611,775 B1. Electrical leakage often occurs as a result of leakage in the region of the electrodes, whereby process liquid penetrates into the measuring device around at least one of the electrodes. The diagnostic circuit measures diagnostic potentials from electrode to ground at each of the two electrodes and forms the sum of the diagnostic potentials. The sum indicates whether electrical leakage is present.

A disadvantage of the flowmeter described above or the method illustrated is that the method is limited to the detection of leakage in the region of the electrodes.

SUMMARY OF THE INVENTION

Based on the prior art as described above, an object of the present invention is to provide a method for operating a magnetic-inductive flowmeter and a flowmeter which ensure a particularly reliable operation of the flowmeter.

According to a first teaching of the present invention, this object is achieved by means of a method of the general type mentioned in the introduction in that the resonant circuit is excited with an excitation frequency, that the measured variable characterizing the resonant circuit is determined, that a comparison value of the measured variable characterizing the resonant circuit for the leak-free case is stored in the control and evaluation unit, and that the measured variable characterizing the resonant circuit is compared to the comparison value.

According to the invention, it was initially recognized that the penetration of moisture into the measuring unit in the event of a leak affects the capacitance of a capacitor. In order to determine a change in capacitance, the influence of this capacitance on a resonant circuit formed by the inductance of the coil, the capacitance and the ohmic line resistance of the coil is considered. It has been recognized that a change in capacitance also changes the characteristics of this resonant circuit.

In principle, the capacitance C of a capacitor can be determined according to the following relationship:

$$C = \varepsilon_0 * \varepsilon_r * A/d,$$

wherein $\varepsilon_0$ is the electric field constant, $\varepsilon_r$ is the relative permittivity, A is the capacitor surface, and d is the distance of the plates of the capacitor.

If moisture now penetrates between the two plates of the capacitor, the relative permittivity $\varepsilon_r$ changes, whereby the capacitance of the capacitor also changes.

According to the invention, at least one measured variable characterizing the resonant circuit formed by the inductance of the coil and the capacitance is determined, and this measured variable is compared to the comparison value of the measured variable in the leak-free case. According to the invention, a leakage of the measuring unit can thus be detected in a particularly simple manner since the coil, which is already present for flow measurement, is used as a leakage sensor. Usually, the coils are used only for the generation of a magnetic field, no measurements are carried out using the coils, flow measurement is carried out via a voltage measurement at the electrodes of the magnetic-inductive flowmeter. According to the invention, however, the field-exciting coils are given a functionality that goes beyond pure field excitation, namely the detection of a leakage. The electrodes required for flow measurement and the part of the measuring and evaluation circuit connected to the electrodes for the flow are not required for leak detection.

It is particularly advantageous when the capacitance is formed by the coil. The capacitance can then be either the parasitic self-capacitance formed between the windings of the coil or also the capacitance that the coil forms with the surrounding components, in particular the housing. Accordingly, no separate capacitor is required as an independent component, rather the capacitances inherent in the system and associated with the field-exciting coil are used according to the invention.

According to a further embodiment of the method according to the invention, the impedance $\underline{Z}$ of the resonant circuit is determined as the measured variable characterizing the resonant circuit. It is likewise advantageous when the absolute value of the impedance $|\underline{Z}|$ is determined as the measured variable characterizing the resonant circuit.

In principle, the impedance $\underline{Z}$ of a resonant circuit with harmonic excitation having the excitation frequency f indicates the ratio between the amplitudes of the alternating voltage and the alternating current as well as the displacement of the phase angles. A change in the capacitance of the resonant circuit also has an effect on the impedance $\underline{Z}$ as well as the absolute value of the impedance $|\underline{Z}|$.

In order to determine the impedance $\underline{Z}$, the resonant circuit is preferably excited with a harmonic excitation signal, in particular an alternating voltage of the excitation frequency f, and both the course of the voltage and the course of the current are determined. The impedance $\underline{Z}$ of the resonant circuit is determined from the ratios of the amplitudes and the phase shift. The ratios of the amplitudes of the courses of both current and voltage correspond to the absolute value of the impedance $|\underline{Z}|$. For this, an impedance measuring device is preferably provided, which is particularly preferably integrated into the control and evaluation unit of the flowmeter.

It is important that the comparison value of the impedance $\underline{Z}$ or the absolute value of the impedance $|\underline{Z}|$ of the resonant circuit is determined with the same excitation frequency f according to this implementation. It is particularly advantageous when the excitation frequency f corresponds to the resonance frequency $f_0$ of the resonant circuit in the leak-free state. The resonance frequency $f_0$ in the leak-free state is preferably determined from the amplitude response of the resonant circuit, as described below.

According to a further advantageous implementation of the method according to the invention, the resonance frequency $f_0$ of the resonant circuit is alternatively or additionally determined as the measured variable characterizing the resonant circuit.

In principle, the resonance frequency $f_0$ of a resonant circuit is ideally derived from the following relationship:

$$f_0 = \frac{1}{2\pi\sqrt{LC}}$$

wherein L is the inductance of the coil and C is the capacitance of the capacitor, wherein the capacitor, as described above, does not have to be designed as a separate component, rather the capacitor is formed by mutually opposing potential areas of the coil itself or by mutually opposing potential areas of the coil with other potential areas of the flowmeter.

A change in the capacitance of the resonant circuit also causes a change in the resonance frequency $f_0$. The determination of the resonance frequency $f_0$ as the variable characterizing the resonant circuit is therefore particularly advantageous because, according to this exemplary implementation, the resonant circuit can be characterized by a fixed value independently of the excitation frequency f.

Particularly preferably, the resonance frequency $f_0$ is determined from the amplitude response of the resonant circuit. For this, the amplitude response, i.e., the absolute value of the impedance $|\underline{Z}|$ of the resonant circuit as a function of the excitation frequency f, is first determined. When the resonant circuit is excited with the resonance frequency $f_0$, the amplitude response has an extreme, i.e. a minimum or a maximum. In this respect, the resonance frequency $f_0$ can be determined particularly easily from the amplitude response as a position of the extreme.

The measured resonance frequency $f_0$ is compared to the comparison value of the resonance frequency $f_0$ of the leak-free state for the purpose of determining whether a leakage is present.

In the resonant circuit to be examined, the capacitance is arranged either parallel to the coil or in series with the coil. To this extent, the resonant circuit is either a parallel resonant circuit or a series resonant circuit.

If the capacitance is arranged parallel to the coil, it is preferably formed as a parasitic self-capacitance between the individual windings of the coil. The resonant circuit formed by the coil and the parasitic self-capacitance is, in this case, a parallel resonant circuit. The amplitude response has a maximum at the position of the resonance frequency $f_0$.

According to this exemplary implementation, the measuring operation for measuring the flow of a medium is preferably interrupted for determining the measured variable characterizing the resonant circuit, in particular for determining the impedance $\underline{Z}$ and/or the absolute value of the impedance $|\underline{Z}|$ and/or the resonance frequency $f_0$ of the resonant circuit. The determination of the measured variable characterizing the resonant circuit, in particular the determination of the impedance and/or the absolute value of the impedance and/or the resonance frequency $f_0$ of the resonant circuit, is then carried out in a leakage measurement process. Such a leakage measurement process can be carried out either spontaneously or regularly with a fixed control frequency. This has the advantage that the flowmeter is regularly checked for possible leakage.

If the capacitance is arranged in series with the coil, then in particular, it is formed between the coil and the housing of the measuring unit. The resonant circuit formed in this manner is a series resonant circuit. The amplitude response has a minimum at the position of the resonance frequency $f_0$.

According to this exemplary implementation, the measuring operation for measuring the flow of a medium is preferably also interrupted for determining the measured variable characterizing the resonant circuit, in particular for determining the impedance $\underline{Z}$ and/or the absolute value of the impedance $|\underline{Z}|$ and/or the resonance frequency $f_0$ of the resonant circuit. The determination of the measured variable characterizing the resonant circuit, in particular the determination of the impedance $\underline{Z}$ and/or the absolute value of the impedance $|\underline{Z}|$ and/or the resonance frequency $f_0$ of the resonant circuit, is then carried out in a leakage measurement process. Such a leakage measurement process can be carried out either spontaneously or regularly at a fixed control frequency.

According to a further preferred implementation of the method according to the invention, a warning is issued when the variable characterizing the resonant circuit is outside the deviation interval. According to this implementation of the method, the user is able to react particularly quickly to the faulty state of the system.

Furthermore, at least one additional moisture sensor can be arranged in the measuring unit, the sensor measuring the moisture in the measuring unit in parallel or offset in time relative to one of the above-described methods.

According to a second teaching of the present invention, the object described in the introduction is achieved by a magnetic-inductive flowmeter having a measuring unit for measuring the flow of a medium through a pipeline, a housing and a control and evaluation unit, wherein the measuring unit comprises at least one coil for generating a magnetic field, wherein a capacitance in conjunction with the coil is present, preferably in the housing, wherein the inductance of the coil with the capacitance forms a resonant circuit, and wherein the resonant circuit has at least one measured variable characterizing it in that the control and evaluation unit is designed such that it determines the measured variable characterizing the resonant circuit when the resonant circuit is excited with an excitation frequency f, that a comparison value of the measured variable characterizing the resonant circuit for the leak-free case is stored in the control and evaluation unit and that the control and evaluation unit compares the measured variable characterizing the resonant circuit to the comparison value.

According to an advantageous design of the flowmeter according to the invention, the control and evaluation unit is designed in such a way that it carries out one of the above-described methods during operation.

For this, the control and evaluation unit preferably has an impedance measuring device that is configured in such a manner that it determines the impedance $\underline{Z}$ and/or the absolute value of the impedance $|\underline{Z}|$ and/or the resonant frequency $f_0$ of the resonant circuit during operation.

Preferably, the measuring unit has at least one additional moisture sensor that, during operation, measures the moisture within the measuring unit.

In detail, there is a plurality of possibilities for designing and further developing the method according to the invention and the flowmeter as will be apparent from the following description of preferred embodiments in conjunction with the accompanying drawings.

DETAILED DESCRIPTION OF THE INVENTION

Figure 1:
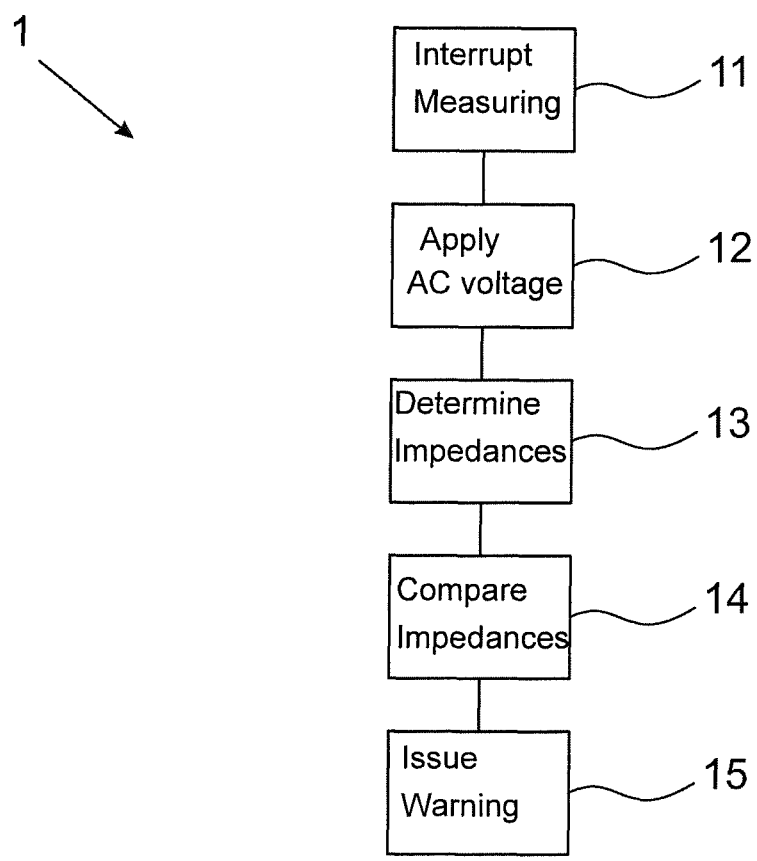
FIG. 1 is a flow chart of first embodiment of a method according to the invention, FIG. 2 schematically depicts a first embodiment of a flowmeter according to the invention.
Figure 2:
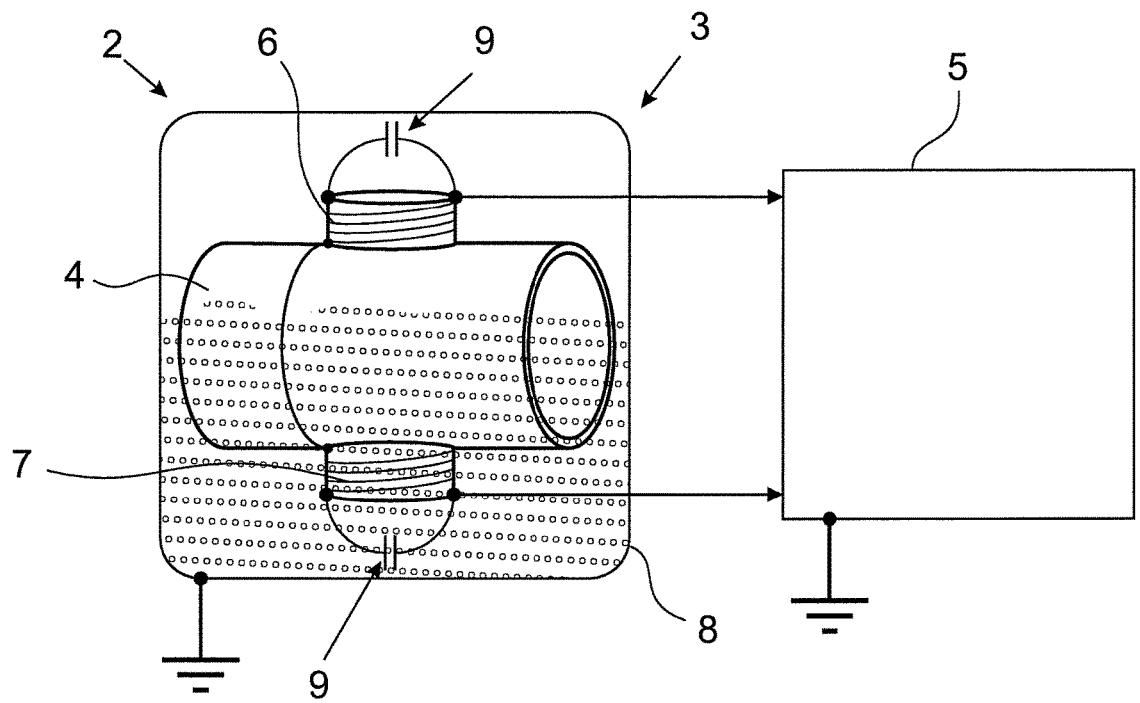

FIG. 1 shows a first embodiment of the method 1 according to the invention for operating a magnetic-inductive flowmeter 2 and FIG. 2 a flowmeter 2 according to the invention. The magnetic-inductive flowmeter 2 has a measuring unit 3 for measuring the flow of a medium through a pipeline 4, a housing 8 and a control and evaluation unit 5, wherein the measuring unit 3 has at least one coil 6, 7 for generating a magnetic field. In the present case, the coil 6, 7 is formed of two parts, a first coil part 6 and a second coil part 7, which are arranged above and below the pipeline 4 in order to produce a magnetic field which is as homogeneous as possible. Electrodes which are usually arranged in the effective range of the magnetic field in the pipeline 4 are required for the actual flow measurement. However, these electrodes are conventional and not of importance here, which is why they are omitted for reasons of clarity.

The coil 6, 7 has a parasitic self-capacitance 9, wherein the inductance of the coil 7 forms a resonant circuit 10 with the parasitic capacitance 9 and the ohmic line resistance of the coil 7, and wherein the resonant circuit 10 has at least one measured variable characterizing it. For the sake of clarity, the parasitic capacitance 9 is symbolized here—in FIG. 2—by the circuit diagram of a capacitor, but the capacitance 9 is actually the parasitic self-capacitance 9 inherent in the coil 6, 7.

In the present embodiment, the impedance Z of the resonant circuit 10 at an excitation frequency f corresponding to the resonance frequency $f_0$ of the resonant circuit 10 in the leak-free state is determined as a variable characterizing the resonant circuit 10.

In a first step 11, the measuring operation of the flowmeter 2 is initially interrupted. In a next step 12, an alternating voltage with an excitation frequency f corresponding to the resonance frequency $f_0$ of the resonant circuit 10 in the leak-free state is applied to the coil 6, 7 in order to determine the impedance $\underline{Z}$. To determine the impedance $|\underline{Z}|$, the courses of the voltage and the current are determined in a next step 13 and the impedance is determined.

For evaluating the impedance $\underline{Z}$ determined in this manner, the value of the impedance $\underline{Z}$ in the resonance case of the resonant circuit in the leak-free state is stored as a comparison value with a deviation interval in the control and evaluation unit 5. In a further step 14, the measured value of the impedance $\underline{Z}$ is compared to the comparison value. If the measured value deviates from the comparison value or if the measured value lies outside a deviation interval, a warning is issued in a next step 15, whereby the user is informed of the presence of a faulty state in good time.

FIG. 2 shows a first embodiment of a flowmeter 2 according to the invention with a measuring unit 3 for measuring the flow of a medium through a pipeline 4, having a housing 8 and having a control and evaluation unit 5, wherein the measuring unit 3 comprises a coil 6, 7 for generating a magnetic field. The coil 6, 7 again is formed of two coil parts 6, 7, which are electrically connected to one another and, in the measuring mode, are traversed by the same current for excitation of the magnetic field required for measurement.

In the present embodiment, leakage is present in the pipeline 4 when moisture has penetrated into the housing 8 and thus into the measuring unit 3. In particular, the coil part 7 is exposed to this moisture.

In addition, it is shown that the coil 6, 7 has a parasitic self-capacitance 9.

Furthermore, a control and evaluation unit 5 is provided, which has both the control electronics for the field coils 6, 7 as well as an impedance measuring device for measuring the impedance with respect to the coils 6, 7.

The control and evaluation unit 5 of the illustrated flowmeter 2 is designed in such a manner that it carries out the method described in FIG. 1 during operation. Accordingly, a flowmeter 2 that ensures particularly reliable operation is shown in FIG. 2.

Figure 3:
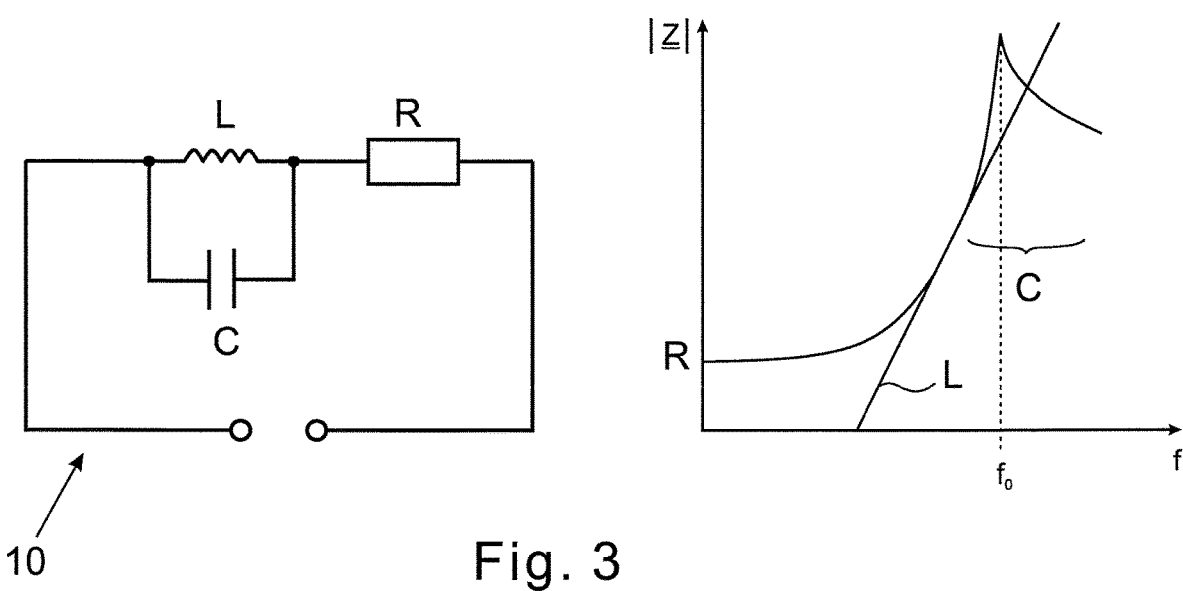
FIG. 3 is a representation of a parallel resonant circuit having an exemplary amplitude response, FIG. 4 schematically depicts a second embodiment of a flowmeter according to the invention.

FIG. 3 shows a representation of a parallel resonant circuit 10, which is formed within the housing 8 of flowmeter 2. In the representation, the resonant circuit 10 is formed by the inductance L of the coil 6, 7, the parasitic self-capacitance C of the coil 6, 7 and the ohmic line resistance R of the coil 6, 7. In addition, the amplitude response is shown, i.e., the absolute value of the impedance $|\underline{Z}|$ in dependence on the excitation frequency f of the resonant circuit 10. The illustration shows that the resonant circuit 10 behaves like the ohmic resistance R at low excitation frequencies f. In approximation to the resonance frequency $f_0$, the absolute value of the impedance $|\underline{Z}|$ corresponds to the behavior of the inductance L. In the resonance case, the absolute value of the impedance $|\underline{Z}|$ has a maximum. Subsequently, the behavior of the oscillating circuit 10 influences the capacitance C. The resonance frequency $f_0$ of the resonant circuit can be determined particularly simply as a position of the maximum.

Figure 4:
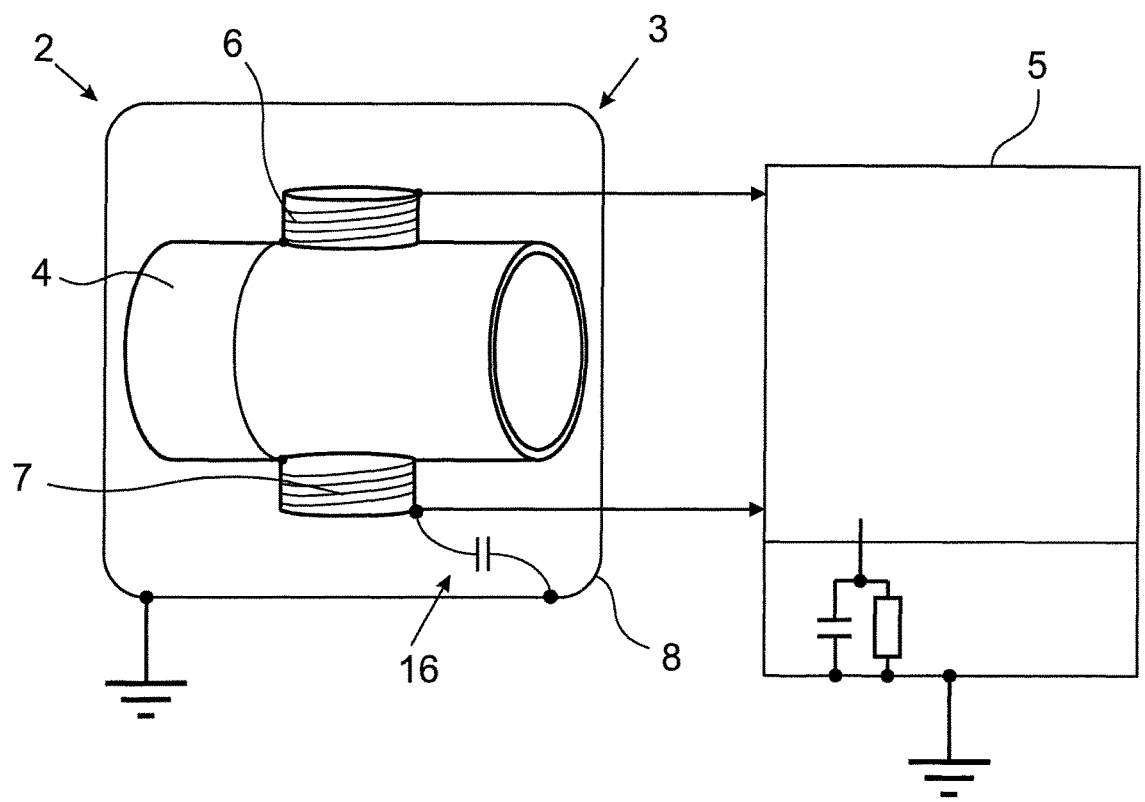

FIG. 4 shows a second embodiment of a flowmeter 2 according to the invention. In the illustrated embodiment, the control and evaluation unit 5 is designed in such a manner that it determines a change in the parasitic capacitance 11, which is formed between the coil 6, 7 and the housing 8. The impedance |Z| is also determined as the variable characterizing the resonant circuit 17. The impedance |Z| can be measured via the coil 6, 7 and the RC network. Alternatively, as long as the impedance measurement has direct contact to ground, the impedance |Z| can also be determined parallel to the RC network. This has the advantage that the impedance determination can also take place during an ongoing flow measurement.

Figure 5:
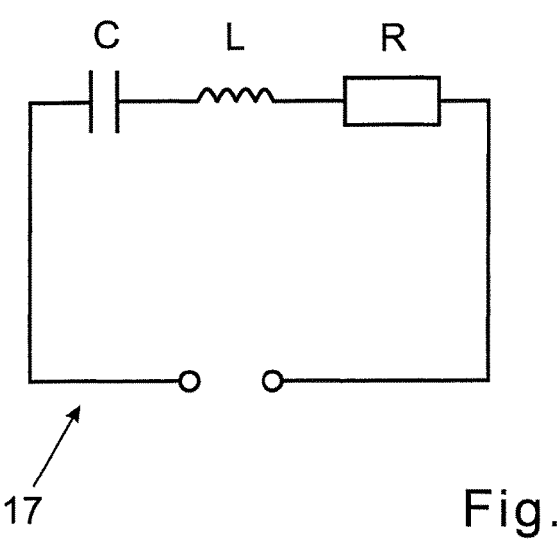
FIG. 5 is a representation of a series resonant circuit having an exemplary amplitude response.
Figure 5:
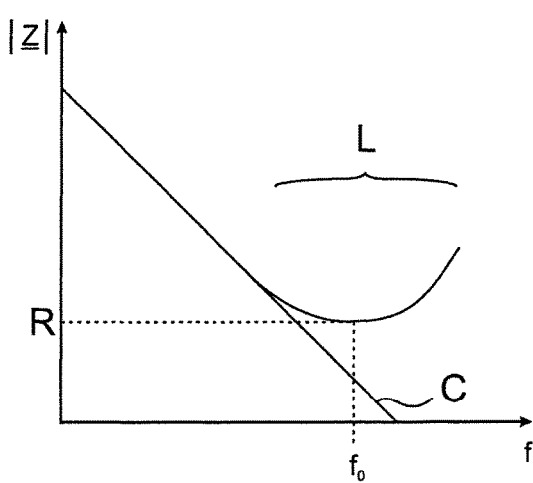

FIG. 5 shows a representation of a series resonant circuit 17 that is formed within the housing 8 of a flowmeter 2, for example, in the previously described second embodiment of the flowmeter 2 according to the invention. In the illustration, the resonant circuit 17 is formed from the inductance L of the coil 6, 7, the capacitance C between the coil 7 and the housing 8, and the ohmic line resistance R of the coil 7. Additionally, the amplitude response is shown, i.e., the absolute value of the impedance |Z| in dependence on the excitation frequency f of the resonant circuit 17. The illustration shows that the resonant circuit 12 behaves like the capacitance C at low frequencies. In the case of resonance, the absolute value of the impedance |Z| is minimal and corresponds to the ohmic resistance R. At higher frequencies, the inductance L increasingly influences the behavior of the resonant circuit 12. The resonance frequency $f_0$ of the resonant circuit can be determined particularly simply as a position of the minimum of the amplitude response.

What is claimed is:

1. Method for operating a magnetic-inductive flowmeter that has at least one measuring unit for measuring a flow of a medium through a pipeline, a housing and at least a control and evaluation unit, wherein the measuring unit has at least one coil for generating a magnetic field, wherein at least one capacitance is formed in conjunction with the coil, wherein an inductance of the coil forms a resonant circuit with the capacitance and wherein the resonant circuit has at least one measured variable characterizing it, comprising the steps of:
exciting the resonant circuit with an excitation frequency f,
determining a measured variable that characterizes the resonant circuit,
storing a comparison value of the measured variable characterizing the resonant circuit for a leak-free case in the control and evaluation unit,
comparing the measured variable characterizing the resonant circuit to the comparison value, and
issuing a warning when the comparison value indicates leakage above predetermined threshold,
wherein an impedance Z of the resonant circuit is determined as the measured variable characterizing the resonant circuit, wherein the impedance is determined by said exciting of the resonant circuit with an alternating voltage, and comprising the further step of detecting a course of both the voltage and the current.

2. Method according to claim 1, wherein the capacitance is formed by the coil.

3. Method according to claim 1, wherein an amplitude response of the resonant circuit is determined and wherein the resonance frequency of the resonant circuit is determined as an extreme value of the amplitude response.

4. Method according to claim 1, wherein the capacitance is arranged in parallel connection with the inductance of the coil and wherein the resonance frequency of the resonant circuit is determined as a position of the maximum of an amplitude response.

5. Method according to claim 1, wherein the capacitance is arranged in series with the inductance of the coil and wherein the resonance frequency of the resonant circuit is determined as a position of a minimum amplitude response.

6. Method according to claim 1, wherein the warning is issued when the measured variable characterizing the resonant circuit deviates from the comparison value by more than a predetermined deviation interval.

7. A method for operating a magnetic-inductive flowmeter that has at least one measuring unit for measuring a flow of a medium through a pipeline, a housing and at least a control and evaluation unit, wherein the measuring unit has at least one coil for generating a magnetic field, wherein at least one capacitance is formed in conjunction with the coil, wherein an inductance of the coil forms a resonant circuit with the capacitance and wherein the resonant circuit has at least one measured variable characterizing it, comprising the steps of:
exciting the resonant circuit with an excitation frequency f,
determining a measured variable that characterizes the resonant circuit,
storing a comparison value of the measured variable characterizing the resonant circuit for a leak-free case in the control and evaluation unit,
comparing the measured variable characterizing the resonant circuit to the comparison value, and
issuing a warning when the comparison value indicates leakage above predetermined threshold, and
wherein the resonance frequency of the resonant circuit is determined as the measured variable characterizing the resonant circuit.

8. Method according to claim 7, wherein an impedance Z of the resonant circuit is determined as an additional measured variable characterizing the resonant circuit.

9. Magnetic-inductive flowmeter, comprising:
at least one measuring unit for measuring a flow of a medium through a pipeline,
a housing and
at least a control and evaluation unit, wherein the at least one measuring unit has at least one coil for generating a magnetic field, at least one capacitance being formed in conjunction with the at least one coil, wherein an inductance of the coil forms a resonant circuit with the at least one capacitance and wherein the resonant circuit has at least one measured variable characterizing it,
wherein the control and evaluation unit determines the measured variable characterizing the resonant circuit when the resonant circuit is excited with an excitation frequency, a comparison value of the measured variable characterizing the resonant circuit for the leak-free case being stored in the control and evaluation unit and the control and evaluation unit being adapted to compare the measured variable characterizing the resonant circuit to the comparison value, and
wherein the control and evaluation unit determines an impedance Z of the resonant circuit as the measured variable characterizing the resonant circuit by exciting the resonant circuit with an alternating voltage and comprising the detecting of a course of both the voltage and the current.

10. Magnetic-inductive flowmeter according to claim 9, wherein the control and evaluation unit determines the resonance frequency of the resonance circuit as an additional measured variable characterizing the resonant circuit.

11. Magnetic-inductive flowmeter according to claim 9, wherein the control and evaluation unit determines an amplitude response of the resonant circuit and determining the resonance frequency of the resonant circuit as a position of an extreme value of the amplitude response.

12. Magnetic-inductive flowmeter according to claim 9, wherein the capacitance is arranged in parallel connection with the inductance of the coil and wherein the control and evaluation unit determines the resonance frequency of the resonant circuit as a position of a maximum of an amplitude response.

13. Magnetic-inductive flowmeter according to claim 9, wherein the capacitance is arranged in series with the inductance of the coil and wherein the control and evaluation unit determines the resonance frequency of the resonant circuit as a position of a minimum of an amplitude response.

14. Magnetic-inductive flowmeter according to claim 9, wherein the control and evaluation unit issues a warning, when the measured value lies outside a deviation interval from the comparison value, that indicates leakage above predetermined threshold.

* * * * *